United States Patent [19]

Sonnek

[11] Patent Number: 5,682,088
[45] Date of Patent: Oct. 28, 1997

[54] BRUSHLESS D.C. MOTOR HAVING A PREDEFINED MINIMUM TIME LAPSE BETWEEN SUCCESSIVE COMMUTATION SWITCHINGS

[75] Inventor: Martin Sonnek, St. Veit/Glan, Austria

[73] Assignee: U.S. Philips Corporation, New York, N.Y.

[21] Appl. No.: 650,206

[22] Filed: May 20, 1996

Related U.S. Application Data

[63] Continuation of Ser. No. 386,903, Feb. 7, 1995, abandoned.

[30] Foreign Application Priority Data

Feb. 9, 1994 [EP] European Pat. Off. ............... 94200318

[51] Int. Cl.$^6$ ........................................... H02H 7/08
[52] U.S. Cl. ........................... 318/254; 318/452; 318/138
[58] Field of Search ............................... 318/601, 603, 318/141, 142, 254, 138, 439, 452; 388/921; 364/484, 572

[56] References Cited

U.S. PATENT DOCUMENTS

| | | | |
|---|---|---|---|
| 4,296,362 | 10/1981 | Beasley | 318/138 |
| 4,400,654 | 8/1983 | Elliott | 318/312 |
| 4,477,757 | 10/1984 | Palombo et al. | 318/696 |
| 4,584,505 | 4/1986 | Chung et al. | 318/254 |
| 4,804,892 | 2/1989 | Muller | 318/254 |
| 4,897,583 | 1/1990 | Rees | 318/138 |
| 4,951,219 | 8/1990 | Zimmer | 364/484 |
| 5,057,753 | 10/1991 | Leuthold et al. | 318/254 |
| 5,285,135 | 2/1994 | Carobolante et al. | 318/254 |
| 5,289,135 | 2/1994 | Hoshino et al. | 328/133 |

*Primary Examiner*—John W. Cabeca
*Attorney, Agent, or Firm*—Edward Blocker

[57] ABSTRACT

In a D.C. motor having a position detector for detecting predetermined rotor positions and an electronic commutation circuit for connecting the stator coils to the power supply in a predefined cyclic order (and for disconnecting them) in dependence upon detected predetermined rotor positions, the no-load speed is limited by delaying the connection of a next stator coil in response to a new detection of a next one of the predetermined rotor positions, until a predetermined delay period has elapsed after a previous detection of another rotor position that lies a predetermined distance ahead of the newly detected rotor position.

9 Claims, 10 Drawing Sheets

BRUSHLESS D.C. MOTOR HAVING A PREDEFINED MINIMUM TIME LAPSE BETWEEN SUCCESSIVE COMMUTATION SWITCHINGS

This is a continuation of application Ser. No. 08/386,903, filed Feb. 7, 1995 now abandoned.

BACKGROUND OF THE CONVENTION

1. Field of the Invention

The invention relates to a brushless D.C. motor comprising
a stator with at least two stator coils,
a rotor rotatably arranged relative to the stator,
position detecting means for detecting predetermined rotor positions,
electronic commutation means for connecting or decoupling respectively, in a predefined cyclic order the stator coils to or from an electric power source.

2. Description of the Related Art

Such a brushless D.C. motor is known, for example, from EP-A-0 425 479.

Furthermore, it is known per se that by shifting the commutation positions in a direction opposite to the direction of rotation, the power of a D.C. motor can be increased with higher speeds. Said shift of the commutation positions is also known as precommutation.

The use of a motor having precommutation is interesting in an environment in which the load of the motor is high with high operating speeds such as, for example, in kitchen utensils such as ice cream making machines and mixers. A disadvantage of such a use is that the speed of the motor in unloaded condition (no-load) can become very high. The very high speeds in unloaded conditions pose stringent requirements on the mechanical construction of the motor.

SUMMARY OF THE INVENTION

It is one of the objects of the invention to provide a brushless motor which is capable of producing much power at high speed and whose speed is restricted in unloaded condition.

According to the invention, this object is achieved by a brushless D.C. motor which is characterized in that the commutation means comprise at least two delay means, each for delaying connecting a next stator coil in response to a new detection of a next rotor position of the predefined rotor positions until a predefined delay period has elapsed after the detection of a rotor-position which rotor position lies a predefined distance ahead of the newly detected rotor position. Due to these measures the power of the motor decreases when the speed of the motor increases up to a value at which the time interval between the detections of successive predefined rotor positions corresponds to the time delay caused by the the delay means. The power of the motor decreases because due to the delay means, the connection of the next stator coil is shifted to a later instant. A further increase of the speed is limited in this way.

An embodiment for the brushless D.C. motor is characterized in that the delay period starts at the detection of a rotor position which lies a predefined distance ahead of the newly detected rotor position. In unloaded condition the speed of the motor will increase up to a value at which the time interval between the detections of successive predefined rotor positions corresponds to the value determined by the predefined delay period. A further increase of the speed will be limited because the connection of the next stator coil is shifted to a later instant, which leads to the fact that the power of the motor decreases.

An embodiment for the brushless D.C. motor is characterized in that the delay period starts in response to the detection of a rotor position which lies a predefined distance ahead of the newly detected rotor position when the delay period of another delay means has elapsed. In unloaded condition the speed of the motor will increase up to a value at which the time interval between the detections of successive predefined rotor positions corresponds to the value determined by the predefined delay period. A further increase of the speed will better limited than in the foregoing embodiment due to the fact that the delay is now cumulative. The delay increases cumulatively as long as the motor speed is above said value. This results in a very steep drop in motor power when the motor speed is above said value so that the motor speed is actually limited to said value.

An embodiment for the brushless D.C. motor is characterized in that the stator coils are magnetically coupled and in that the commutation circuit comprises means causing the decoupling of connected stator coils and the connection of the next stator coil to take place substantially simultaneously.

In this embodiment the simultaneous decoupling and connection in combination with the magnetic coupling cause the magnetic energy to be transmitted from one to the other stator coil. As against a commutation during which there is an excitationless time interval between the decoupling of a stator coil and the connection of the next stator coil, this embodiment is advantageous in that the dissipation in the motor is considerably smaller. In an excitationless time interval it is customary to short-circuit the stator coil during the interruption of each excitation. As a result of the energy stored in the stator coil, a short-circuit current will flow through the stator coil, which causes a considerable heat dissipation in the stator coils to take place. This is contrary to a commutation during which the magnet energy is transmitted from one to the other stator coil during the commutation.

An embodiment which is interesting for its simplicity is characterized in that the means for realising simultaneous connection and decoupling comprise a state memory which can be brought to various states, while each state corresponds to an excitation state, in which the commutation means comprise controllable switches for connecting and decoupling the stator windings and means for bringing the switches to the blocking state or conductive state respectively, depending on the state of the state memory, and means for adapting the state of the state memory in response to detections of the predefined rotor positions, and in which the delay means are arranged for delaying the connecting operations by delaying the adaptation of the state of the memory.

An embodiment of the brushless motor is characterized in that the signal suppressing means comprise monostable multivibrators responding to the detection of the predetermined rotor positions, the outputs of the multivibrators being connected via diodes to control inputs of the state memory to receive the adaptation signals.

An embodiment for the brushless D.C. motor is characterized in that the output of a multivibrator of one delay means is connected via a diode to the input of a multivibrator of another delay means. With simple means the above mentioned embodiment can be improved to obtain a cumulative delay as already described such that the speed limitation of the motor is defined more accurately.

An embodiment of the brushless motor is characterized in that setting means are provided for setting the predefined delay period. In this embodiment the value to which the speed is to be restricted can be simply set.

BRIEF DESCRIPTION OF THE DRAWINGS

Embodiments of the invention are represented in the drawing and will be further described hereafter, in which.

DESCRIPTION OF THE PREFERRED EMBODIMENTS

Figure 1:
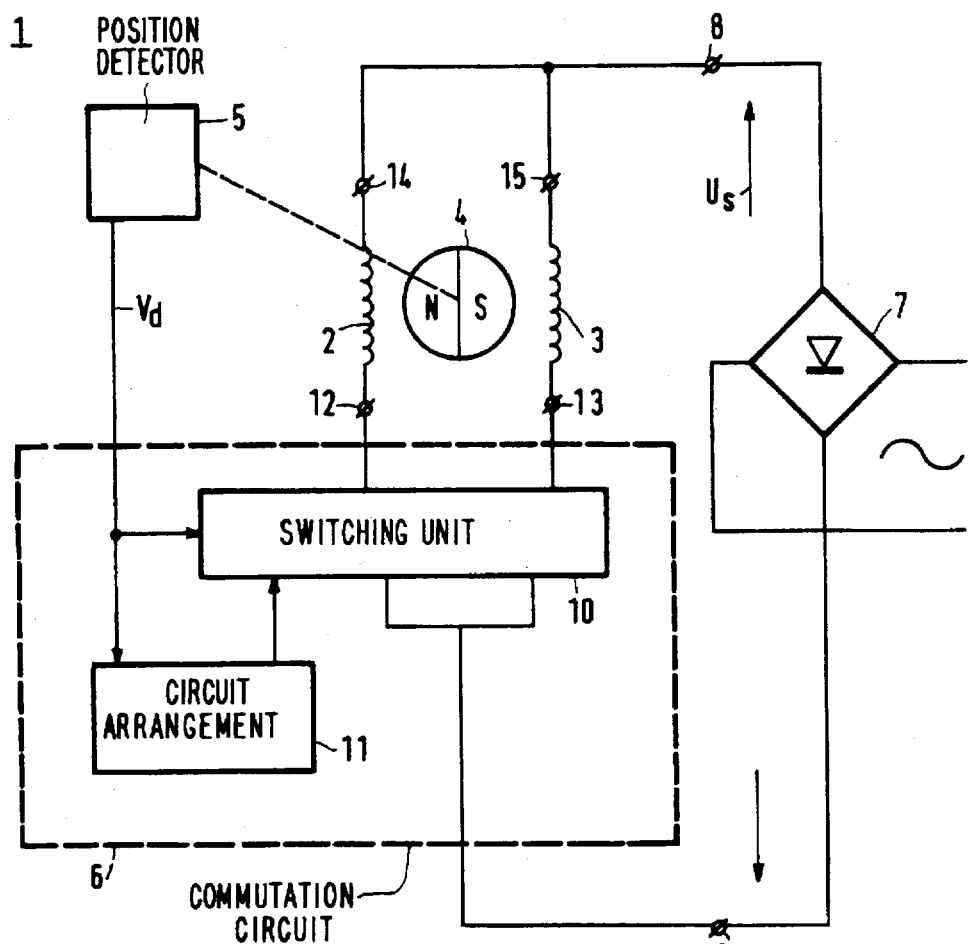
FIG. 1 shows an embodiment for the motor according to the invention.

FIG. 1 shows an embodiment for a brushless D.C. motor 1 according to the invention. The brushless D.C. motor 1 comprises a stator with two stator coils 2 and 3. As a result of the excitation of the stator coils 2 and 3 after a predefined cyclic pattern, a varying magnetic field is produced which exerts a torque on a permanent-magnet rotor 4 which is rotatable relative to the stator. To provide that the torque caused by the magnetic field is always exerted in the same direction, the change-over (commutation) of the excitation from an excited stator coil to a next stator coil is to take place at predetermined rotor positions also referenced commutation positions hereinafter. For the detection of the commutation positions the brushless D.C. motor 1 comprises a position detector 5. This position detector 5 may be of a customary type and have, for example, a so-called Hall sensor which is arranged so that this sensor is influenced by the magnetic field produced by the permanent-magnet rotor 4. The position detector 5 produces a detection signal Vd which indicates the instants at which the commutation positions are detected. Furthermore, the brushless D.C. motor includes a commutation circuit 6 which, in response to the detections of the commutation positions indicated by the detection signal Vd, connects the stator coils 2 and 3 in a predetermined cyclic order to an electric power source and decouples them therefrom, which power source is connected to terminals 8 and 9.

Figure 2:
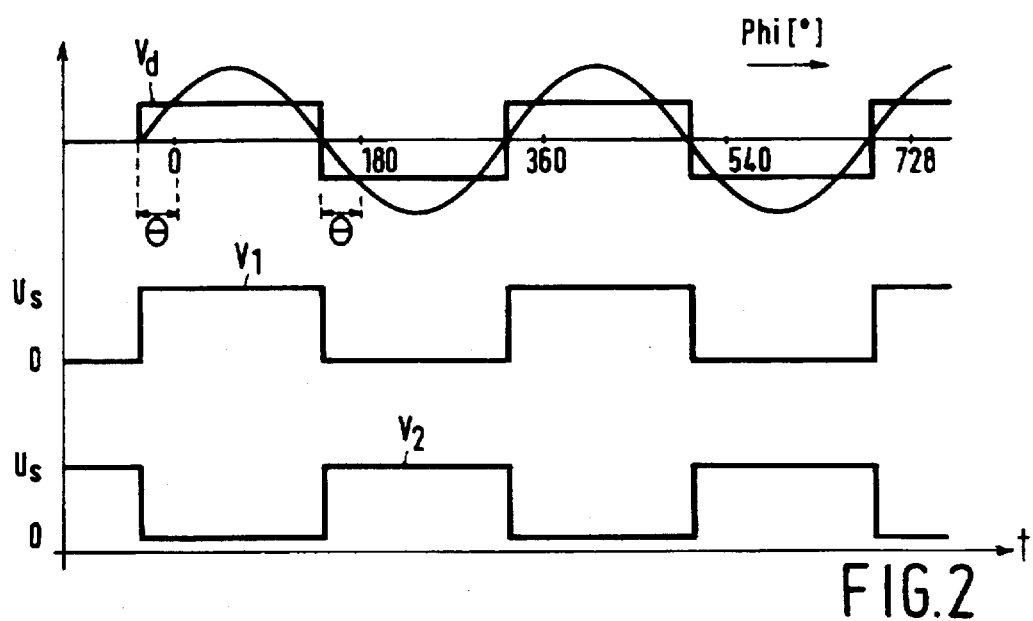
FIGS. 2 and 10 show detection signals plotted against a rotor position, which detection signals are supplied by a rotor position detector in two different embodiments of the motor according to the invention.

The electric power source preferably comprises a D.C. power source 7 producing a substantially constant voltage. Such a D.C. voltage source may comprise, for example, a customary D.C. rectifier circuit for rectifying the mains voltage of an AC voltage network. Basically, the power source may also comprise a D.C. current source producing a constant D.C. current which is substantially independent of the load. By way of illustration FIG. 2 shows the detection signal Vd plotted against the rotor position phi. The values phi=0.180 degree correspond to the rotor positions in which the change of the dependence of the rotor position on the magnetic field which field is minimized is generated by the permanent-magnet rotor 4 in the stator coils 2. These positions will further be referenced neutral rotor positions. For low speeds of the motor the commutation preferably takes place at these neutral rotor positions. In the case of high speeds the power of D.C. motors in which the commutation takes place at the neutral rotor positions drops sharply. For these speeds the power of the motor (=produced power) is increased in that the commutation positions are advanced relative to the neutral rotor positions. In FIG. 2 the neutral rotor positions lie at phi=0° and phi=180°. The commutation positions are advanced relative to the neutral positions over a distance $\Theta$. The signal level transition in the signal Vd denote the commutation positions phi=–$\Theta$ and phi=180–$\Theta$.

The commutation circuit 6 comprises a switching unit 10 via which a terminal 9 is connected to a connecting point 12 of the stator coil 2 and a connecting point 13 of the stator coil 3. A connecting point 14 of the stator coil 2 and a connecting point 15 of the stator coil 3 are connected to the terminal 8. The switching unit 10 is of a type which in normal operation connects the connecting point 12 of the stator coil 2 or the connecting point 13 of the stator coil 3 to the terminal 9 depending on the signal level of the detection signal Vd. FIG. 2 shows by way of illustration the voltages V1 and V2 on the stator coils 2 and 3 caused by the circuit 10 as a function of the rotor position.

The type of commutation described above for which the commutation does not take place at the neutral rotor positions but at commutation positions which are advanced relative to the neutral rotor positions (against the direction of rotation of the motor) will be referenced precommutation hereinafter. As observed above, the precommutation increases the power of the motor at high speeds. This means that in unloaded condition (no-load) the speed of the motor can reach considerably higher values than of a motor without precommutation. Such extremely high no-load speeds pose stringent requirements on the mechanical construction of the motor.

In fields of application such as kitchen appliances, ice cream making machines and mixers in which the D.C. motor is to produce much power at high speed, in which, however, it also often occurs that the motor runs in unloaded condition, it is therefore desirable to take precautionary measures as a result of which the no-load speed is restricted.

For restricting the no-load speed, the D.C. motor according to the invention comprises a circuit arrangement 11 for delaying the connection of a next stator coil in response to a new detection of a next commutation position, until a predefined delay period has elapsed since the detection of a commutation position, the latter lying a predefined distance ahead of the newly detected commutation position.

Figure 3:
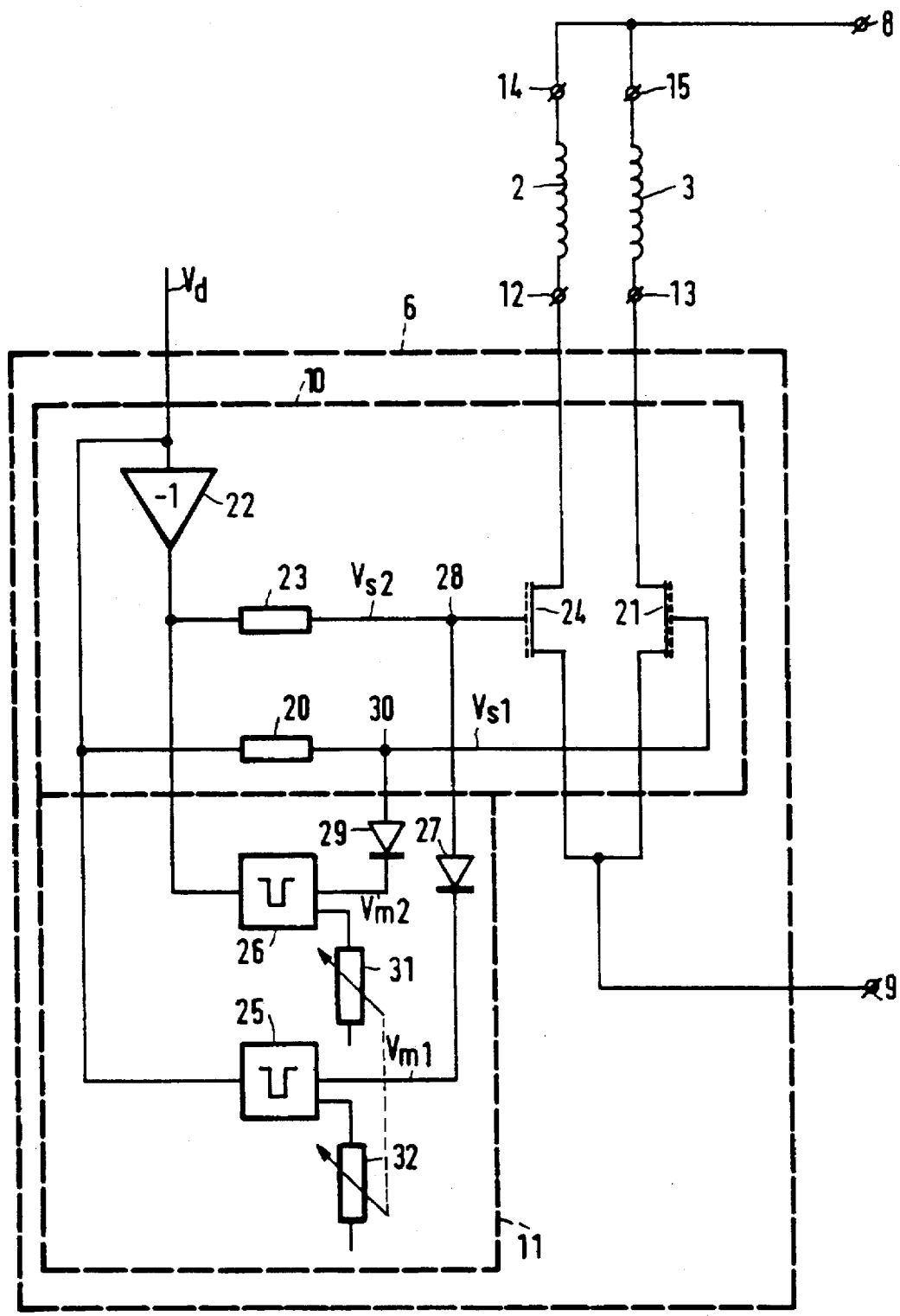
FIGS. 3, 7, 9, 11 and 12 show embodiments for circuit arrangements to be used in a motor according to the invention.

FIG. 3 shows in detail a possible embodiment for the circuit arrangement 11 and of the switching unit 10. In the embodiment of the switching unit 10 shown the detection signal Vd is applied as a control signal to a control input of a voltage-controlled switch 21. The switch 21 is situated between the terminal 9 and the connecting point 12 of the stator coil 2. The detection signal Vd is inverted in an inverter circuit 22. An inverted detection signal Vd' obtained in this manner is applied as a control signal to a control input of a voltage-controlled switch 24 via a resistor 23. The voltage-controlled switches, however, may be formed by transistors of the so-called FET type. However, alternative types of switches may also be used.

The circuit arrangement 11 comprises a first monostable multivibrator (25) and a second monostable multivibrator 26 of a type producing an output signal that has a low voltage level in response to a change of an input signal from a low voltage level to a high voltage level during a time interval having the length of the delay period tr. After the delay period tr the output signal assumes a high voltage level. The detection signal Vd is applied to the monostable multivibrator 25 as an input signal. The output signal of the monostable multivibrator 25 is applied via a diode 27 to a junction 28 between the resistor 23 and the control input of the switch 24. The cathode of the diode 27 is then connected to the monostable multivibrator 25, while the anode of the diode 27 is connected to the junction 28. The inverted detection signal Vd' is applied to the monostable multivibrator 26 as an input signal. The output signal of the monostable multivibrator 26 is applied via a diode 29 to a junction 30 between the resistor 20 and the control input of the switch 21. The cathode of the diode 29 is then connected to the monostable multivibrator 26 while the anode of the diode 29 is connected to the junction 30.

The operation of the circuit arrangement shown in FIG. 3 will be further explained below with reference to FIGS. 4 and 5.

Figure 4:
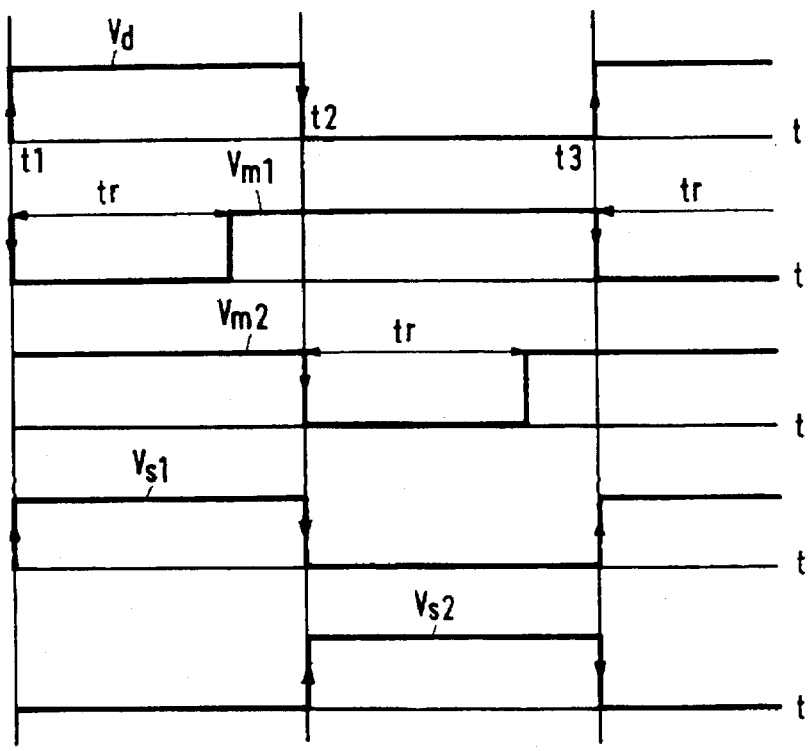
FIGS. 4, 5, 8 and 13 show plotted against time a plurality of signals occurring in embodiments for the motor according to the invention.

FIG. 4 shows for the case where the speed is lower than a limit speed, the detection signal Vd, the output signal Vm1 of the monostable multivibrator 25, the output signal Vm2 of the monostable multivibrator 26, the voltage Vs1 on the control input of the switch 21 and the voltage Vs2 on the control input of the switch 24 as a function of time t. At the instant t1 the signal level of the detection signal Vd changes from low to high resulting in the output signal Vm1 of the monostable multivibrator 25 assuming a low signal level for a period of time having the length of the delay period tr. After the signal level of the signal Vm1 has become high again, the signal level of the detection signal Vd changes from high to low at the instant t2 and thus the signal level of the inverted detection signal Vd1 changes from low to high. As a result, the voltage level of the control signal Vs1 changes from high to low and the switch 21 is brought to a blocking state. Worded differently: the stator coil 2 is decoupled from the D.C. voltage source 7. Since the voltage level of signal Vm1 has already become high, the signal level of the control signal Vs2 will change from low to high in response to the change of the signal level of the inverted detection signal Vd', leading to the fact that the switch 24 is brought to a conducting state. Worded differently: the stator coil 3 is connected to the D.C. voltage source 7 in response to a change of signal level of the inverted detection signal Vd' from low to high.

Similarly, at instant t3, in response to a change of the signal level of the detection signal Vd from low to high, the stator coil 3 is decoupled from the D.C. voltage source and, simultaneously, the stator coil 2 is again connected to the voltage source 7.

As can be learnt from FIG. 4, the output signals Vm1 and Vm2 of the monostable multivibrators 25 and 26 do not have any effect on the commutation insofar as the time difference between the successive changes of signal levels of the detection signal exceeds the delay period tr.

Figure 5:
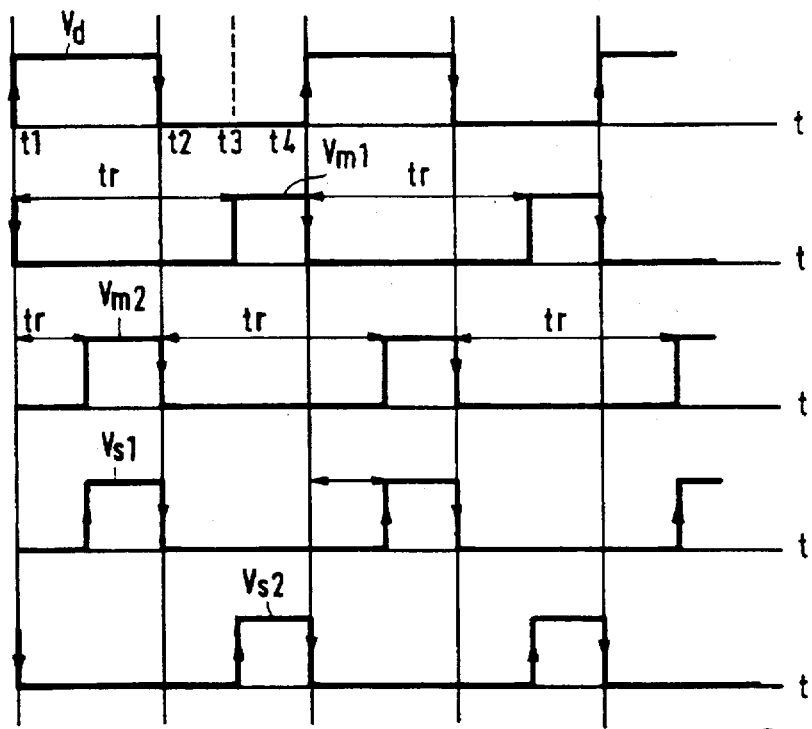

FIG. 5 shows the same signals as FIG. 4 for the case where the time difference between the successive changes of signal levels of the detection signal is smaller than the delay period tr. In the detection signal Vd shown in FIG. 5 there is a change of signal level from low to high at instant t1. If at instant t2 the signal level of the detection signal Vd becomes low again, the signal level of the output signal Vm1 of the monostable multivibrator 25 has not yet returned to the high signal level, so that the signal level of the control signal Vs2 for the switch 24 is retained at the low signal level of the output signal Vm1 by means of the diode 27 until the signal level of Vm1 becomes high again. This takes place at instant t3 which is shifted relative to instant t1 by a period of time corresponding to the length of the delay period tr. Worded differently: the change of the signal level of the control signal Vs2 is delayed until the period of time having the length of the delay period tr has elapsed since the instant t1. This instant t1 denotes the instant of detection of a commutation position that lies a predetermined distance (180° in this case) ahead of the commutation position detected at instant t2.

Similarly, after the change of the signal level of the detection signal which takes place after instant t4, the change of the signal level of the control signal Vs1 is delayed until a period of time corresponding to the delay period tr has elapsed since the instant t2. The decoupling of the stator coils is not affected by the output signals Vm1 and Vm2 of the monostable multivibrators. There is a twofold effect of the level increase of the control signals Vs1 and Vs2.

Firstly, as a result of the delay of the rise of control signal level, the connection of the next stator coil to be excited takes place at a commutation position that is shifted backwards (in the direction of rotation) relative to the commutation position belonging to the precommutation. This shift leads to a reduction of the motor power.

Secondly, between the excitation of successive stator coils there is always an excitationless time interval which also leads to a reduction of the motor power. The two said effects lead to the fact that beyond a limit speed, at which the time interval between the successive changes of signal levels of the detection signal become smaller than the delay period tr, the motor power is reduced and, as a result, the speed is limited.

In the embodiment of the motor described above, there is a certain excitationless time interval between the decoupling of the excited stator coil and the connection of the next stator coil when there is an effective speed limitation. After the excited stator coil has been decoupled, the magnetic energy stored in the excited stator coil is to be diminished. Customarily, the decoupled stator coil is then short-circuited, for example, via a so-called freewheeling diode. However, this is disadvantageous in that the stator coils are considerably heated as a result of the attendant short-circuit currents.

A commutation method for which there is considerably less heat dissipation in the stator coils, is a method in which the stator coils are magnetically coupled and in which no excitationless time intervals occur between the decoupling of an excited stator coil and the connection of a next stator coil. In that case, during commutation the magnetic energy in the decoupled stator coil is transmitted to the stator coil that has a magnetic coupling with the decoupled stator coil. A requirement is then, however, that the connection of the next stator coil to the D.C. voltage source takes place substantially simultaneously with the decoupling of the excited stator coil.

Figure 6:
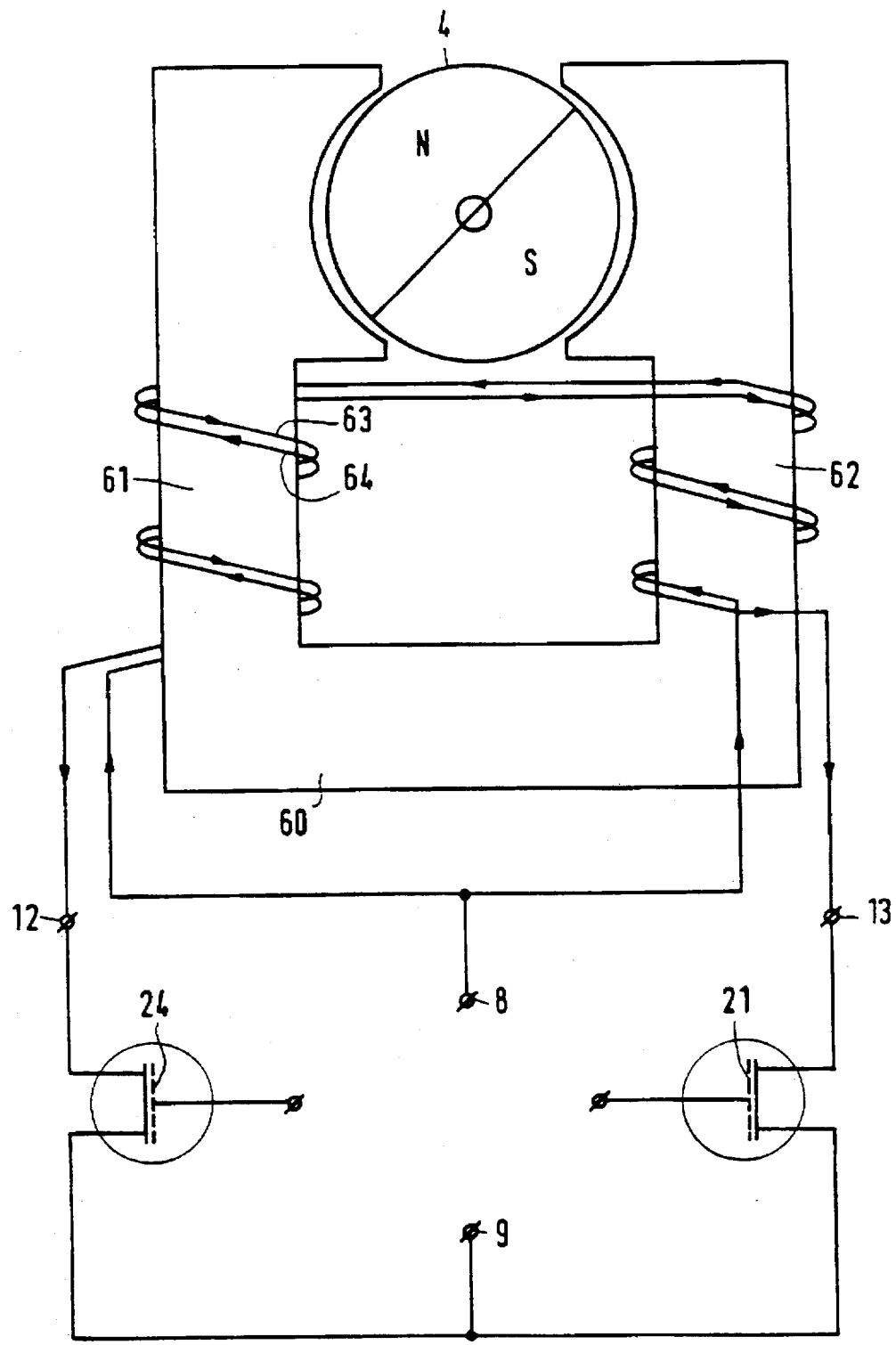
FIG. 6 shows an embodiment for a magnetic circuit to be used in a motor according to the invention.

Before an embodiment for the D.C. motor according to the invention is described, in which precautions are taken to have the decoupling and the connection take place simultaneously even when the no-load speed is limited, first an embodiment for the magnetic circuit of a D.C. motor in which a substantially complete magnetic coupling occurs between the stator coils will be described with reference to FIG. 6. The magnetic circuit comprises a substantially U-shaped stator of magnetoconducting material. The ends of the limbs 61 and 62 of the stator 60 enclose a substantially cylinder-shaped room in which the rotor 4 is arranged rotatably. Bifilar windings surround the limbs 61 and 62 of the stator 60. The windings of the first wire 63 of the bifilar winding form the stator coil 2 and the windings of the second wire 64 of the bifilar winding form the stator coil 3. The stator coil 2 formed by wire 63 lies between the switch 24 and the terminal 8. The stator coil 3 formed by wire 64 lies between the switch 21 and the terminal 9. The connection of the stator coils is such that with the closed switch (excited state) the direction of the magnetic flux generated in the stator by the stator coils 2 and 3 is opposite. The embodiment for the magnetic circuit shown in FIG. 6 affords the advantage that there is a substantially magnetic coupling between the stator coils 2 and 3. Although the embodiment shown in FIG. 6 is preferred because of the substantially complete magnetic coupling between the stator coils, there should be observed that other magnetic circuits too in which a magnetic coupling occurs between the stator coils are possible.

Figure 7:
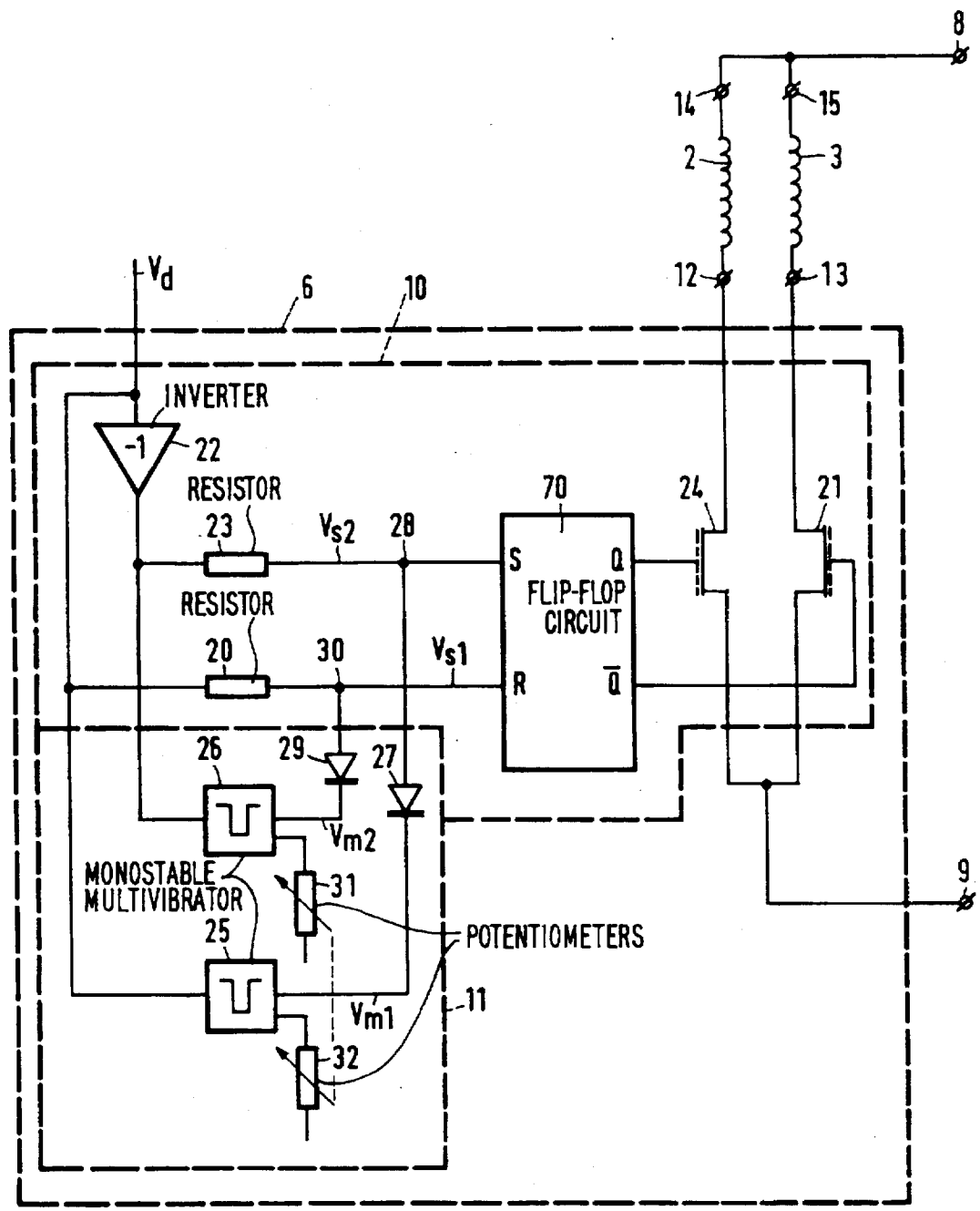

FIG. 7 shows another embodiment for the combination of the switching unit 10 and the circuit arrangement 11 which embodiment is highly suitable in that it is used in brushless D.C. motors in which there is a magnetic coupling between the stator coils. In FIG. 7, the elements corresponding to the circuit elements shown in FIG. 3 carry like reference characters.

The switching unit shown in FIG. 7 comprises means effecting a substantially simultaneous decoupling and connection respectively, of the connected stator coils and the next stator coil. These means comprise a state memory which can be brought to a plurality of different states while each state corresponds to a state of excitation. This state memory is formed by an RS flip-flop circuit 70 in the embodiment shown in FIG. 7. The RS flip-flop circuit 70 is of a customary type which is set from low to high on a set input and is reset from low to high on a reset input in response to another change of signal level. The set input (S) of the flip-flop circuit 70 is connected to the junction 28. The reset input (R) is connected to the junction 30. The flip-flop circuit 70 has two outputs which supply two output signals which are mutually inverted and indicate whether the flip-flop circuit is set or reset. The output signals of the flip-flop circuit 70 are effective as control signal Vs1 and Vs2 for the switches 21 and 24, so that the switches 21 and 24 is brought to the blocking or conducting state in accordance with the state of the flip-flop circuit 70 (set or reset). Because the control signals of the switches 21 and 24 are always mutually inverted, the decoupling of one stator coil from the D.C. current source 7 always takes place simultaneously with the connection of the other stator coil to the D.C. current source 7.

Figure 8:
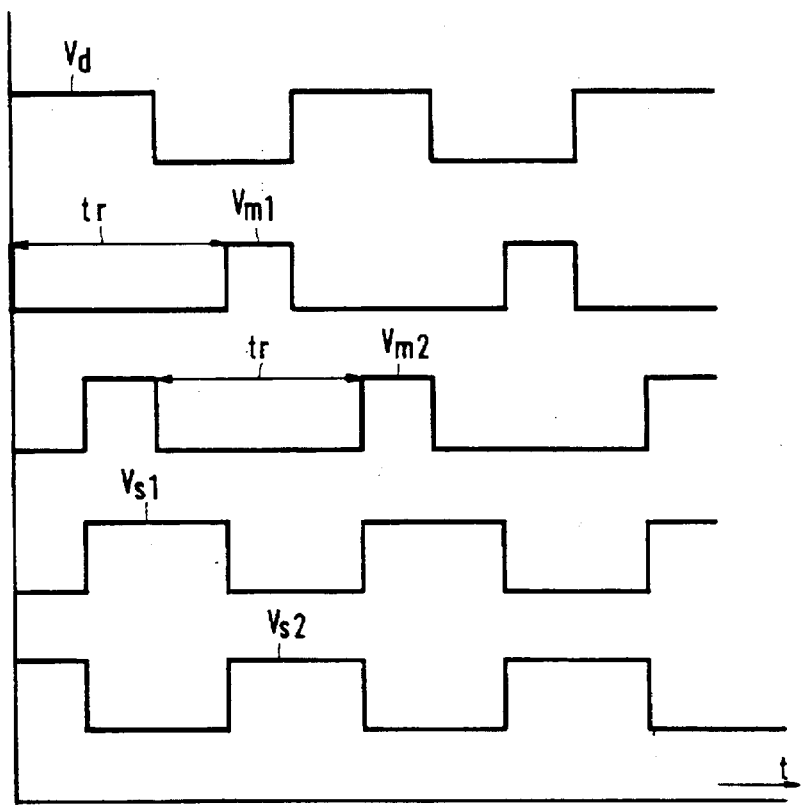

By way of illustration FIG. 8 shows the signals Vd, Vm1, Vm2, Vs1 and Vs2 occurring in the embodiment shown in FIG. 7 and plotted against time for the case where the speed limitation works. The delay period tr exceeds in that case the time interval between two successive changes of signal level of detection signal Vd, so that the instant of commutation is delayed which leads to the fact that the power of the motor is reduced and, as a result, a further increase of the speed is avoided.

Figure 10:
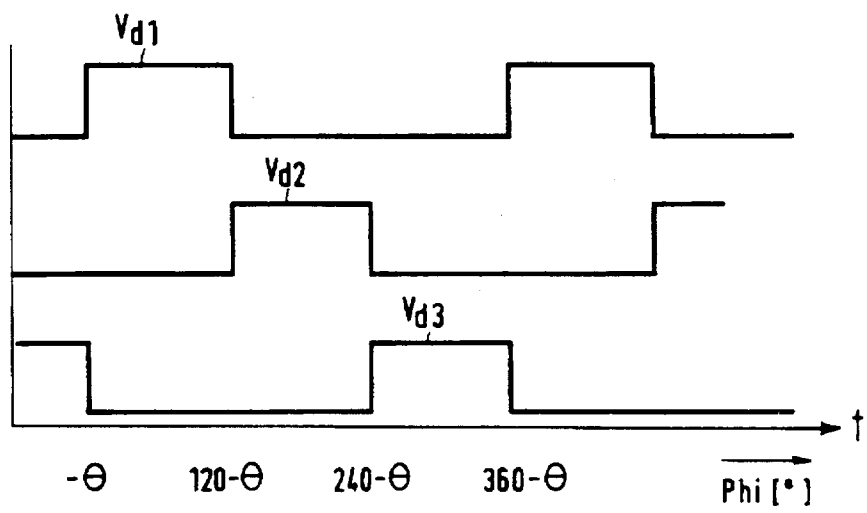
Figure 9:
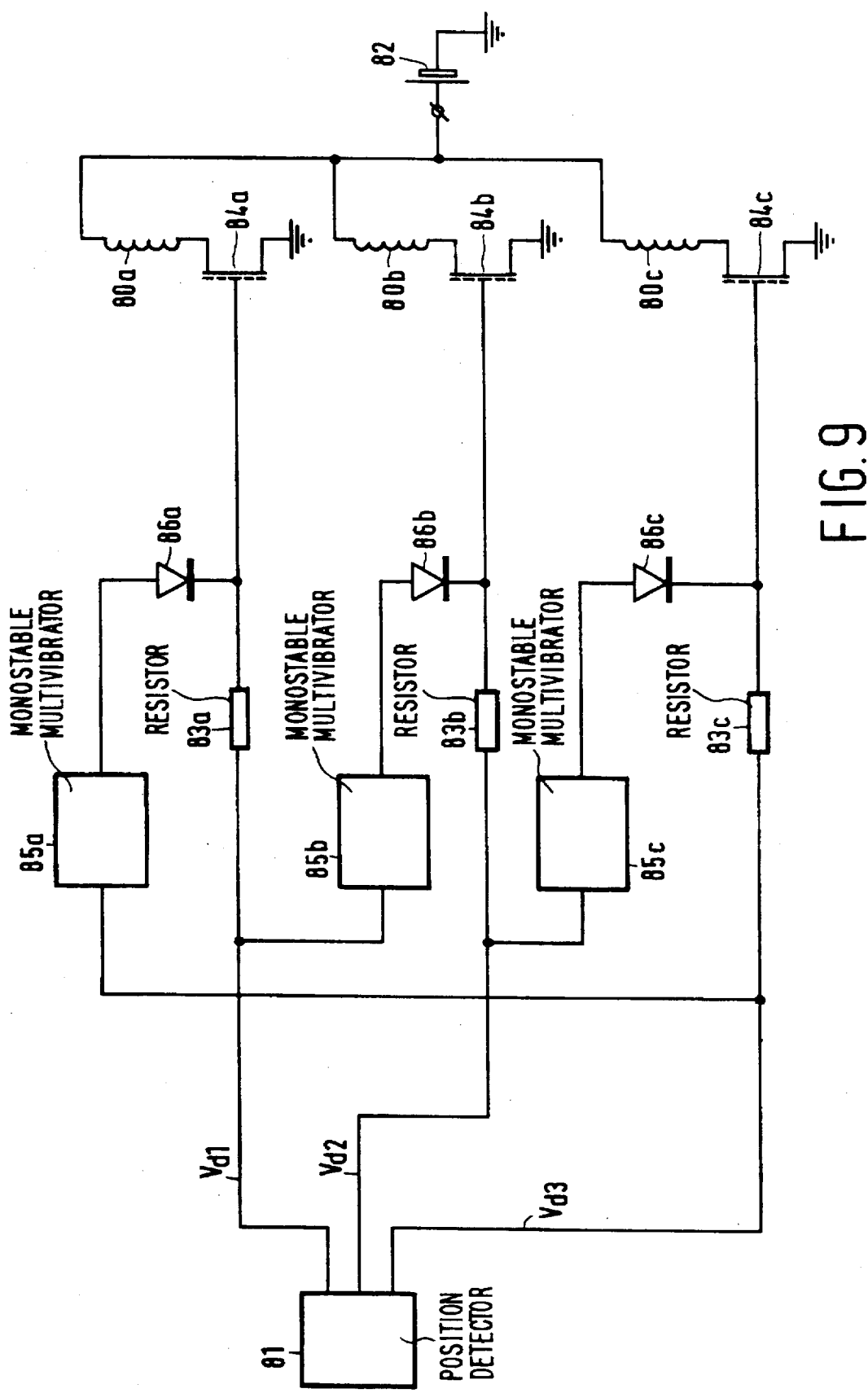

The invention has been described above for a two-phase motor. It will be obvious to a person of ordinary skill that the invention can also certainly be applied to D.C. motors having three or more stator coils. FIG. 9 shows by way of example an embodiment for a brushless motor containing three stator coils 80a, 80b and 80c. A position detector 81 detects three successive commutation positions shifted by 120° relative to each other. These commutation positions are the rotor positions at which during normal operation each time a next stator coil 80 is to be connected to the D.C. voltage source 82. The position detector 81 is of a customary type which produces three detection signals Vd1, Vd2 and Vd3 in which the transitions from a low to a high signal level indicate the instants at which said commutation positions are detected by the position detector 81. FIG. 10 shows by way of illustration the detection signals Vd1, Vd2 and Vd3 plotted against the rotor position. The detection signals Vd1, Vd2 and Vd3 are applied to the control inputs of voltage-controlled switches 84a, 84b and 84c respectively, via resistors 83a, 83b and 83c, respectively. To delay the connection of the stator coil 80a to the D.C. voltage source 82, the motor comprises a monostable multivibrator 85a whose input is supplied with the detection signal Vd3 and whose output signal is applied via a diode 86a to a junction between the resistor 83a and the control input of the switch 84a. The detection signal Vd3 indicates the detection of the commutation position which is situated 120° ahead of the commutation position whose detection is indicated by the detection signal Vd1. In a manner similar to that described with reference to FIGS. 3 and 5, the connection of the stator coil 80a is delayed until a period of time corresponding to the delay period tr has elapsed since the last change of signal level from low to high in the detection signal Vd3. Similarly, with the aid of the monostable multivibrators 85b and 85c and the diodes 86b and 86c the connections of the stator coils 80b and 80c are delayed.

Figure 11:
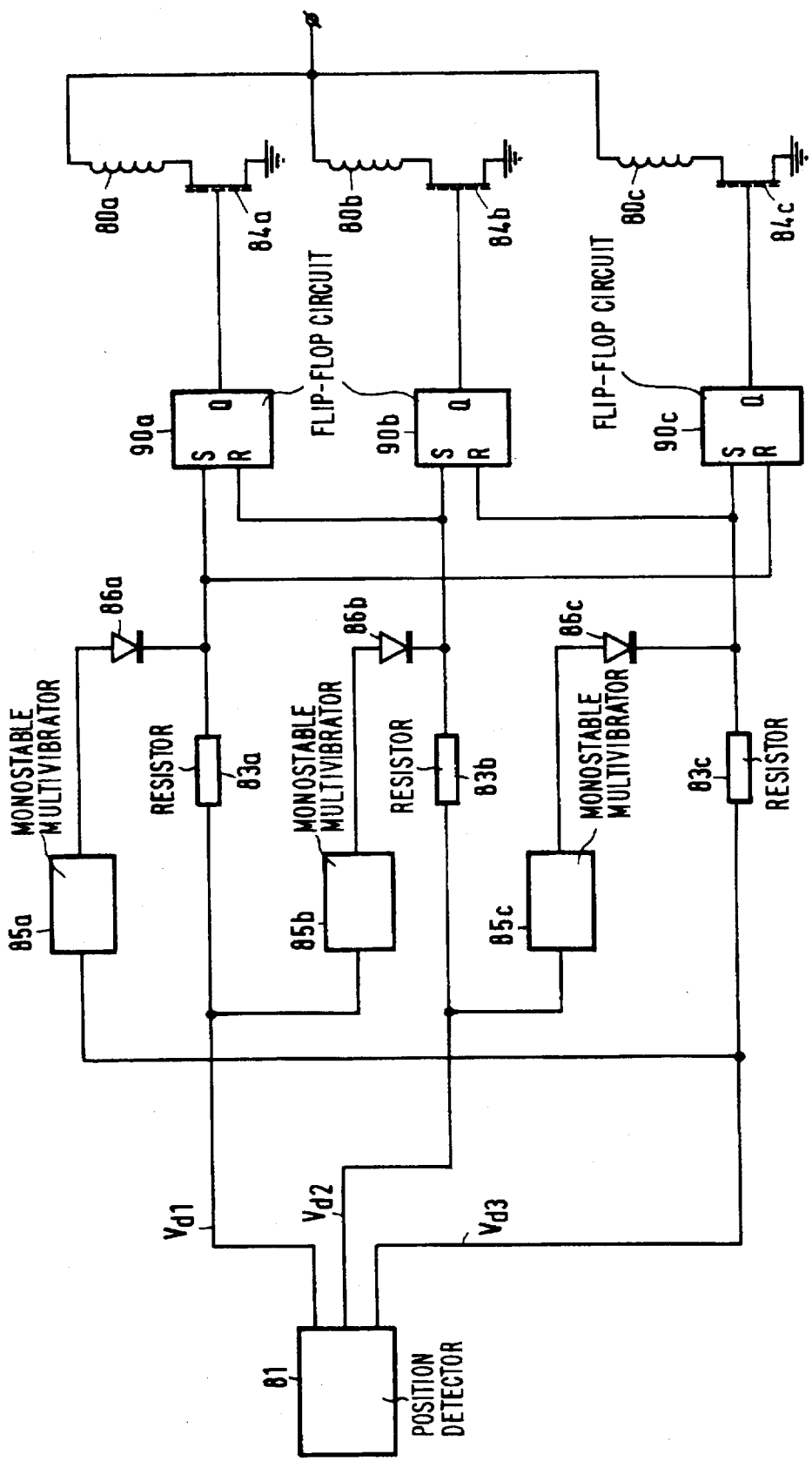

FIG. 11 shows a modification of the embodiment shown in FIG. 10, which modification comprises a state memory formed by three RS flip-flop circuits 90a, 90b and 90c whose set inputs (S) and reset inputs (R) are connected to the junction between the resistors 83 and the diodes 86. As a result of the use of the state memory, there is achieved, similarly to the manner shown in FIG. 7, that the decoupling of a connected stator coil and the connection of the next stator coil takes place substantially simultaneously.

Figure 12:
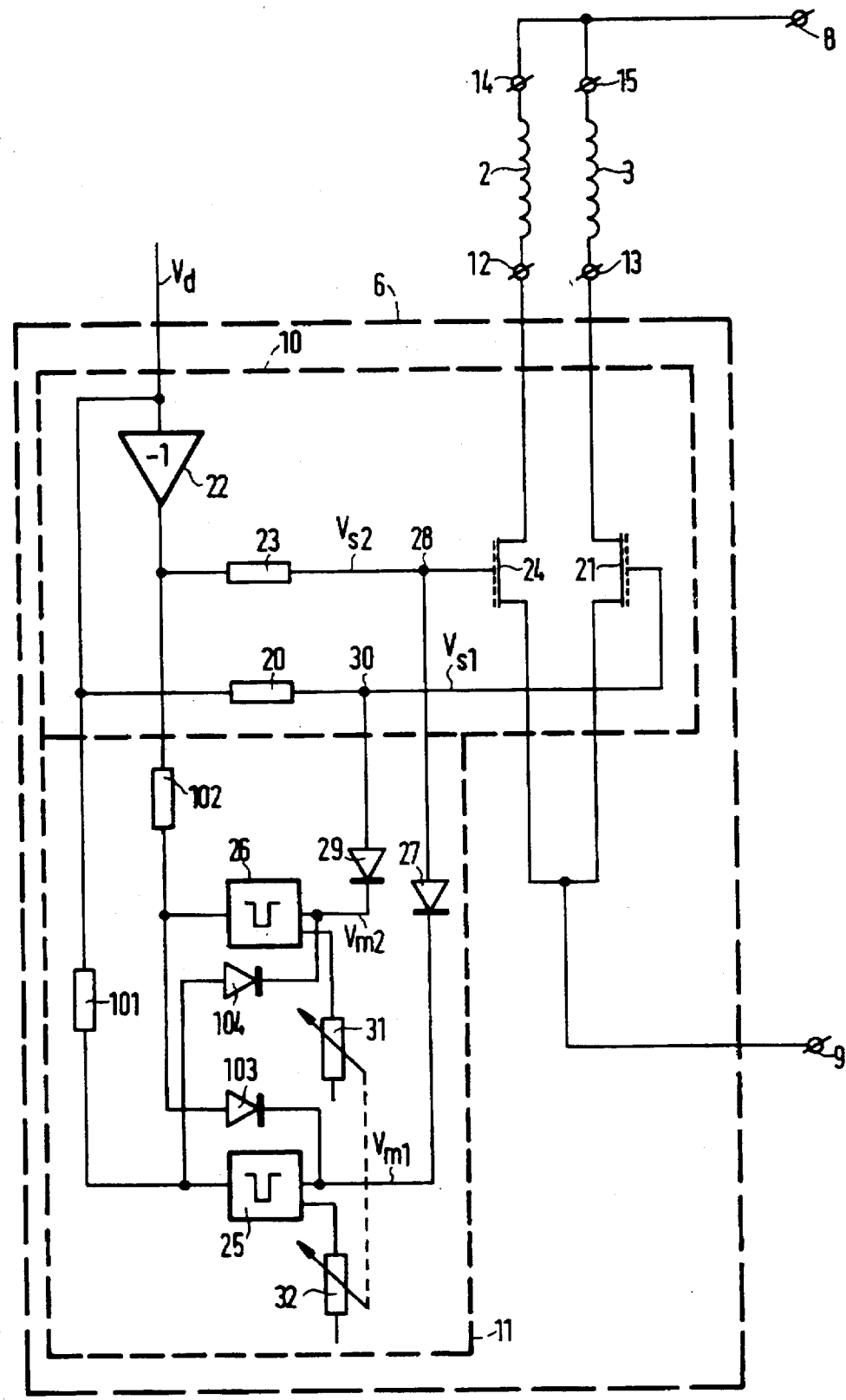

FIG. 12 shows in detail another possible embodiment for the circuit arrangement 11. The detection signal Vd is applied to the monostable multivibrator 25 as an input signal via a resistance 101. The output signal of the monostable multivibrator 25 is applied via a diode 103 to the input of the monostable multivibrator 26. The inverted detection signal Vd' is applied to the monostable multivibrator 26 as an input signal via a resistance 102. The output signal of the monostable multivibrator 26 is applied via a diode 104 to the input of the monostable multivibrator 25. With the diodes 103 and 104 the multivibrators 25 and 26 are now coupled. The resistances 101 and 102 serve to prevent a direct short circuiting of Vd and Vd'. The operation of the circuit arrangement shown in FIG. 3 will be further explained below with reference to FIGS. 4 and 13.

FIG. 4 shows for the case where the speed is lower than a limit speed, the detection signal Vd, the output signal Vm1 of the monostable multivibrator 25, the output signal Vm2 of the monostable multivibrator 26, the voltage Vs1 on the control input of the switch 21 and the voltage Vs2 on the control input of the switch 24 as a function of time t. Hence when the motor speed is lower than the limit speed there is no difference in the operation of the circuits of FIG. 3 and FIG. 12.

Figure 13:
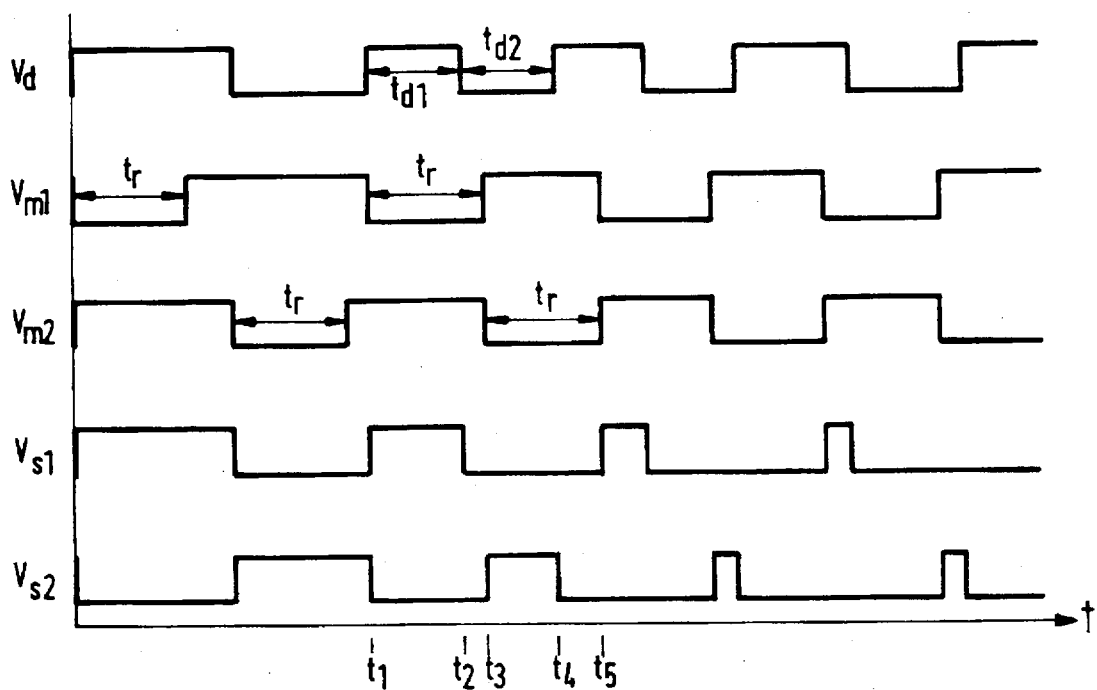

FIG. 13 shows the same signals as FIG. 4 for the case where the time difference between the successive changes of signal levels of the detection signal varies around the delay period tr. In the detection signal Vd shown in FIG. 13 them is a change of signal level from low to high at instant t1 followed by a change of signal level from high to low at instant t2. At this instant t2 the signal level of the output signal Vm1 of the monostable multivibrator 25 has not yet returned to the high signal level, so that the signal level of the control signal Vs2 for the switch 24 is retained at the low signal level of the output signal Vm1 by means of the diode 27 until the signal level of Vm1 becomes high again. This takes place at instant t3 which is shifted relative to instant t1 by a period of time corresponding to the length of the delay period tr. Worded differently: the change of the signal level of the control signal Vs2 is delayed with a period tr-td1 (where td1=t2−t1) until the period of time having the length of the delay period tr has elapsed since the instant t1. This instant t1 denotes the instant of detection of a commutation position that lies a predetermined distance (180° in this case) ahead of the commutation position detected at instant t2.

After the change of the signal level of the detection signal Vd which takes place at instant t4, the change of the signal level of the control signal Vs1 is delayed until t5 when a period of time corresponding to the delay period tr has elapsed since the instant t3 (which was t2 in the embodiment according to FIG. 3). This is because the multivibrator 26 can only be triggered after the output of the multivibrator 25 has returned to the high signal level. Worded differently: the change of the signal level of the control signal Vs1 is delayed with a period tr-td1+tr-td2 (where td2=t4−t2) since the instant t1. Hence. there is a cumulative effect due to the coupling of the multivibrators. A further increase of the speed is avoided due to the fact that the delay is now cumulative. This results in a delay which increases cumulatively as long as td1, td2 etc. are larger than tr. This causes in a very steep drop in motor power when the motor speed is above said value so that the motor speed is actually limited to said value.

Figure 14:
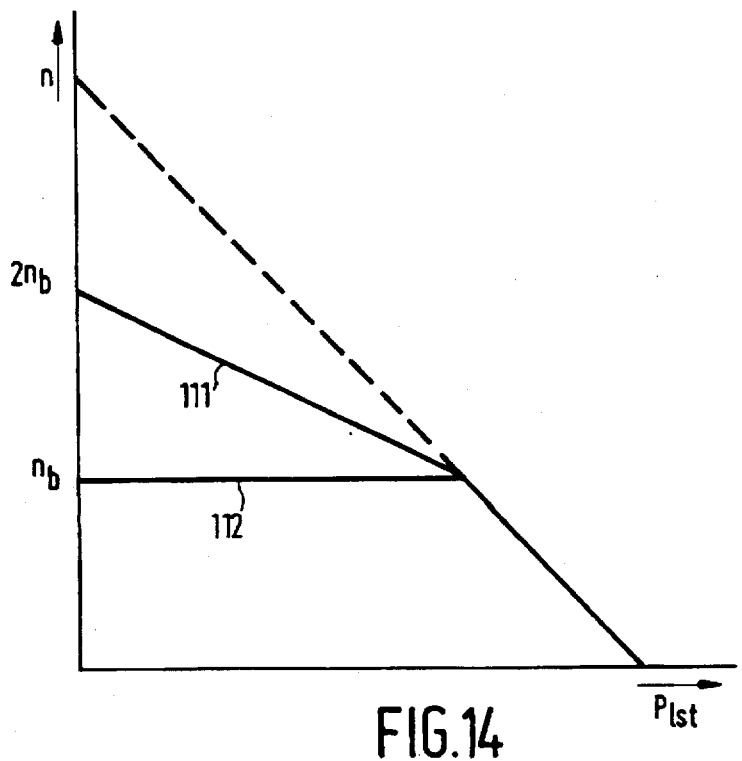
FIG. 14 shows the speed plotted against mechanical load for a motor according to the invention.

By way of illustration FIG. 14 shows the pattern of the speed n of the motor according to the invention as a function of the mechanical load Plst of the motor. With reference numeral 111 the pattern of speed is presented for the embodiment according to FIG. 3. With decreasing load Plst the speed n increases until a limit speed nb is reached. With a decreasing load the speed limitation becomes operative and, as a result of the shift of the instant at which the next stator coil is connected, the motor power is reduced and the speed is limited between nb and 2nb.

With reference numeral 112 the pattern of speed is presented for the embodiment according to FIG. 12. With decreasing load Plst the speed increases until a limit speed nb is reached. With a decreasing load the speed limitation becomes operative and, as a result of the cumulative shift of the instant at which the next stator coil is connected, the motor power is reduced until the speed corresponds to the limit speed nb.

By way of illustration FIG. 14 shows in a dashed line the speed pattern in the case where no precautions for speed limitation have been taken. By setting the delay period tr, the limit speed nb can be set. When monostable multivibrators are used, as is the case in the embodiments shown in FIG. 3 and 12, the delay period tr can be simply set by setting the resistance of a resistor, which resistor controls the period of time of the previous drop of the level of the output signal, which drop is caused in response to changes of signal level in the detection signal Vd. Potentiometers 31 and 32 can be used for setting said resistance, which potentiometers are connected to the monostable multivibrators 25 and 26 and whose sliders are mechanically coupled.

Hereinbefore the invention has been described with reference to embodiments in which the commutation circuit is formed by a so-called hard-wired circuit. There should be observed that the motor according to the invention can also be manufactured comprising commutation circuits in which the instants at which the various stator coils are to be decoupled and connected are determined by means of so-called program-controlled circuits in the form, for example, of a microprocessor which is loaded with a suitable control program.

Finally, there should be observed that the invention is certainly suitable for use in combination with precommutation, because the no-load speed can assume a very high value with such motors. However, the invention is also applicable to motors in which no precommutation is used.

I claim:

1. Brushless D.C. motor comprising
a stator with at least two stator coils,
a rotor rotatably arranged relative to the stator,
position detecting means for detecting predetermined rotor positions,
electronic commutation means for connecting or decoupling respectively, in a predefined cyclic order the stator coils to or from an electric power source, characterized in that the commutation means comprise at least two delay means, each of said delay means delaying connecting a next stator coil in response to a new detection of a next rotor position of the predefined rotor positions until a minimum predefined absolute delay period has elapsed after detection of a previous rotor position, said previous rotor position lying a predefined distance ahead of the newly detected next rotor position and said delay period having a preset constant value regardless of motor speed and during all states of rotor operation.

2. Brushless D.C. motor as claimed in claim 1, characterized in that the delay period starts at detection of said previous rotor position which lies a predefined distance ahead of the newly detected next rotor position.

3. Brushless D.C. motor as claimed in claim 1, characterized in that the delay period starts in response to the detection of said previous rotor position which lies a predefined distance ahead of the newly detected next rotor position, but not earlier than when the delay period of another delay means has elapsed.

4. Brushless D.C. motor as claimed in claim 1, characterized in that the stator coils are magnetically coupled and in that the commutation circuit comprises means causing the decoupling of connected stator coils and the connection of the next stator coil to take place substantially simultaneously.

5. Brushless D.C. motor as claimed in claim 4, characterized in that the means for realising simultaneous connection and decoupling comprise a state memory which can be brought to various states, while each state corresponds to an excitation state, in which the commutation means comprise controllable switches for connecting and decoupling the stator windings and means for bringing the switches to the blocking state or conductive state respectively, depending on the state of the state memory, and means for adapting the state of the state memory in response to detections of the predefined rotor positions, and in which the delay means are arranged for delaying the connecting operations by delaying the adaptation of the state of the memory.

6. Brushless D.C. motor as claimed in claim 5, characterized in that the memory adapting means comprise means for deriving adaptation signals based upon the detections of the rotor positions to effect the adaptation of the state of the state memory and in which the delay means are arranged such that they suppress the adaptation signals for a predetermined delay period following the detection of the rotor position which rotor position lies the predefined distance ahead of the newly detected rotor position.

7. Brushless D.C. motor as claimed in claim 6, characterized in that the signal suppressing means comprise monostable multivibrators responding to the detection of the predetermined rotor positions, the outputs of the multivibrators being connected via diodes to control inputs of the state memory to receive the adaptation signals.

8. Brushless D.C. motor as claimed in claim 3, characterized in that the output of a multivibrator of one of said delay means is connected via a diode to the input of a multivibrator of another one of said delay means.

9. Brushless D.C. motor as claimed in claim 1, characterized in that setting means are provided for setting the predetermined delay period.

* * * * *